(No Model.) 2 Sheets—Sheet 2.
W. NERACHER.
FIRE EXTINGUISHING APPARATUS.
No. 372,167. Patented Oct. 25, 1887.
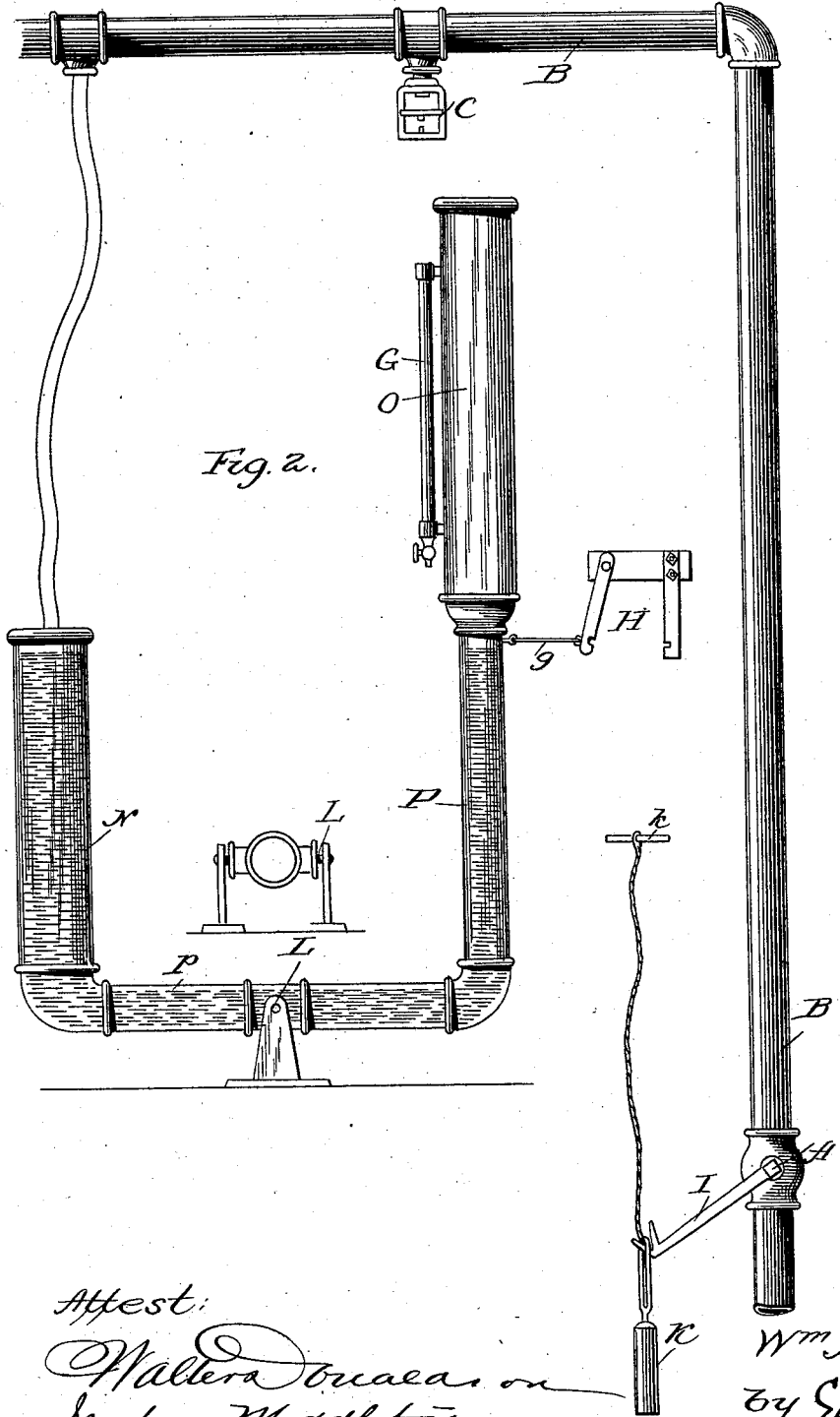

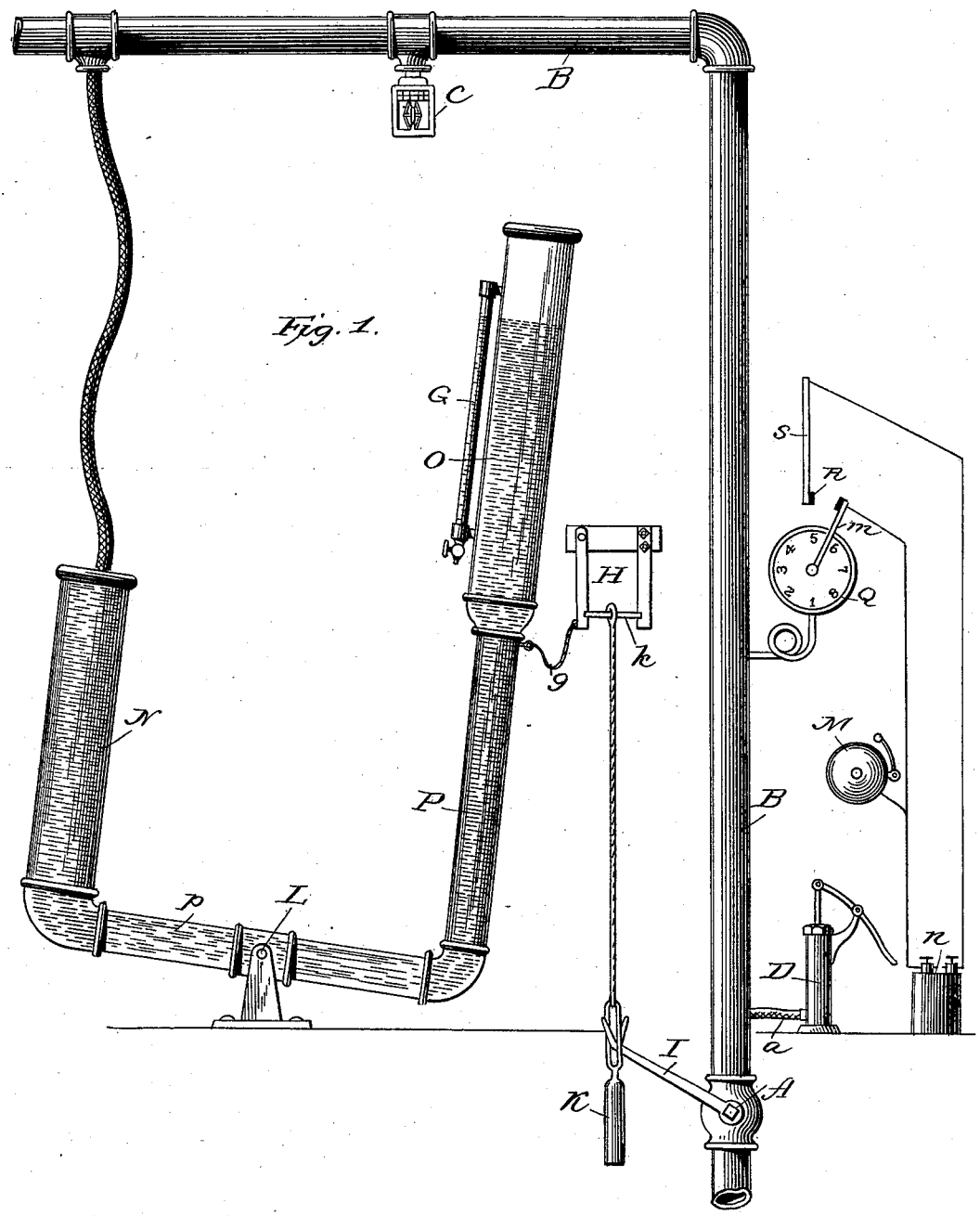

UNITED STATES PATENT OFFICE.

WILLIAM NERACHER, OF CLEVELAND, OHIO.

FIRE-EXTINGUISHING APPARATUS.

SPECIFICATION forming part of Letters Patent No. 372,167, dated October 25, 1887.

Application filed October 13, 1886. Serial No. 216,157. (No model.)

*To all whom it may concern:*

Be it known that I, WILLIAM NERACHER, of Cleveland, in the county of Cuyahoga and State of Ohio, have invented a new and useful Improvement in Fire-Extinguishing Apparatus; and I do hereby declare that the following is a full, clear, and exact description of the same.

My invention relates to what are known as "automatic fire-sprinklers," and of the class more specifically designated as "dry-pipe system," used in connection with fire-sprinklers in which the pipes within the building are charged with air under pressure between the main supply or water valve and the sprinkler-valves. In case of fire, one or more of the automatic sprinklers being opened by the action of heat, the air escapes through the opening or openings of the sprinkler which has been released, and thus effecting the opening of the valve by which water is admitted to the pipes supplying the sprinklers.

My invention consists of a new device, of simple and effective construction, for opening the valve when the air is released.

In the accompanying drawings, Figure 1 represents the apparatus in side elevation, with the sprinklers closed and the pipes filled with air under pressure. Fig. 2 shows a similar elevation, with the sprinklers open and the weight opening the valve.

In the drawings, B represents the main supply-pipe, in which is a valve, A, adapted to exclude the water from the sprinkler-pipes which are in the building. On the stem of the valve A is an arm, I, having a prong on which is suspended a weight, K, which weight is sufficient, when allowed to fall freely, to open the valve. The weight is suspended by a cord attached to a cross-piece, $k$, which is adapted to be connected to a retaining-piece, H. This consists of one fixed arm and one pivoted or movable arm, in each of which is a notch facing inward and adapted to receive the ends of the cross-piece and sustain the weight in the position shown in Fig. 1, in which the valve is closed. The movable arm of the retaining device H is attached to one leg of a bent tube, which is pivoted at L. The legs of this tube are of unequal length, both legs being closed air-tight. The tube N is connected with the pipe B at some point inside of the valve A. I have shown the bent tube as being formed of parts N $p$ P O, the horizontal part $p$ being pivoted at L, connecting the lower ends of the parts N and P, the latter of which is smaller than the former. The parts N and O are about the same in diameter, but vary in length, the tube O being about one-fourth longer. This extra length of the tube O forms an air-chamber. When the liquid is forced from tube N into tube O, the air in tube O becomes compressed to the same extent as the air in the pipes B, and this compressed air in the upper end of the tube O forms a cushion, and in case one or more sprinklers are released by the action of heat this air-cushion will greatly assist in forcing the liquid from tube O into tube N, which accomplishes the dropping of the weight and the opening of the valve. The pivot L is about midway between parts N and P, so the tubes N $p$ P O will balance at L when all tubes are empty and before they are charged with liquid. When the liquid is first put into the leg, and before the pipes B are charged with air, the large tube N and small tubes $p$ P will be filled with the liquid, as shown; but as soon as air is applied by charging the pipes B the liquid will be forced from the tube N up into the tube O, which has up to this time been empty, and by thus transferring the weight of the liquid from one side of the pivot L to the opposite side the leg tips on its pivot to that side. The longer leg, O P, is connected, by chain, cord, or other flexible connection, $g$, with the movable arm of the retaining device H.

The horizontal part of the pipe B is supplied with any desired number of sprinklers, as C. Supposing these sprinklers to be closed, air is forced by means of an air-pump, D, through a pipe, $a$, into the main pipe and branches between the valve A and the sprinkler-valves. The air thus forced in is under pressure and forces the liquid out of the leg N of the bent tube into the part O, and the apparatus assumes the position shown in Fig. 1. This of course assumes that the valve A has been closed and that the arm upon its stem is also in the position shown in Fig. 1. The weight is also shown as suspended by the retaining device H. If, now, any one or more of the sprinklers should be opened, air would be allowed to escape from the pipe B, and the liquid in the bent tube, being relieved from pressure, would seek its equilibrium and the weight be shifted from the longer leg to the shorter leg, the devices causing the tube to tip to the position shown in Fig. 2, thereby drawing the movable part of the retaining device away from the cross-piece and allowing the weight to drop to open the valve, as also shown in Fig. 2. This allows the liquid to flow to the sprinklers and gives effect to the apparatus.

I do not confine myself to the precise form of the bent tube, as this is simply designed to represent a convenient form of chamber in which liquid is forced by air-pressure to one side and there held, and by the releasing of the air-pressure is allowed to flow to the other side, thus shifting the balance and causing the tube to tip.

I am aware that a solid body might be inclosed in a tight pivoted chamber to be held by the air on one side or released to fall by gravity on the other side in the same manner, and my invention includes such shifting medium in a pivoted chamber, held and released as described; nor do I confine myself to the releasing device or the special mechanism by which the tipping of the tube causes the valve to open. This represents any suitable connection with the valve whereby the tipping of the tube is made to open the valve.

I have shown a glass tube, G, attached to the upper part of the longer leg of the liquid-tube and having connection therewith, by means of which the height of the liquid in the part O may be ascertained, and thus the amount of air-pressure be properly applied. In connection with this apparatus or any of its kind I have provided, also, mechanism for giving timely notice of any leak in the pipes whereby ultimately the weight would be shifted in the bent tube and the liquid turned on from the main supply. This consists of an alarm-gong, M, which is in circuit with an electric battery, $n$. The wire from one pole of the battery is connected to a conducting-rod, S, which has contact point R. The wire from the other pole includes the gong, which is connected to the movable hand of the air-gage Q. This air-gage is connected with the interior of the pipe occupied by the air under pressure, and it is so arranged that when the air-pressure within the pipe B is up to the required point it will move the hand $m$ sufficiently to remove the contact-point thereon from the point R and thus break the circuit; and while the pressure so remains the circuit will be opened and the gong will remain silent; but when the pressure falls, say, from eight (the required amount) down to five pounds, the hand will move sufficiently to bring the contact-points together and close the circuit, when the gong will be sounded and the alarm given.

It will be understood that the sprinklers referred to are any of the automatic-acting sprinklers—such, for example, as those shown in my Letters Patent granted on the 22d day of April, 1884, No. 297,432.

I claim as my invention—

1. In combination with the main supply-pipe and distributing-pipes provided with the sprinkler-valves, a valve, A, in the supply-pipe, an air-supply in connection with the distributing-pipes, a pivoted chamber, a flexible connection between one end of said chamber and the distributing-pipes, a movable medium inclosed with the pivoted chamber adapted to be held in one side thereof by the pressure through the flexible connection and to flow to the other side to tip the said chamber when the air-pressure is removed, and a movable connection between the pivoted chamber and the valve A, substantially as described.

2. In combination with the main supply-pipe and a branch pipe having a sprinkler-valve of the class described, a valve, A, in the main pipe, a pivoted chamber containing liquid, a flexible pipe connecting one end of the pivoted chamber to the space within the main pipe, whereby air may be admitted to hold the liquid upon one side of the pivoted chamber, a weight suspended by retaining devices over the arm of the valve A, and connection between the retaining devices and the pivoted chamber, whereby the opening of the sprinkler-valve causes the chamber to tip and the weight to drop upon the valve-stem, substantially as described, and for the purpose set forth.

3. In combination with the pipe B, having a sprinkler thereon, and a valve, A, a pivoted bent tube having longer and shorter legs, the shorter being connected by a flexible pipe to the pipe B at some point between the valve A and the end of the main pipe, the releasing mechanism connected to the bent tube, and a weight adapted to fall on the arm of the valve A, whereby the weight is released to open the valve by tipping of the tube, substantially as described.

In testimony whereof I have signed my name to this specification in the presence of two subscribing witnesses.

WILLIAM NERACHER.

Witnesses:
R. B. WILLIAMSON, Jr.,
J. C. SMITH.